N. K. BOWMAN.
CABLE SPLICE.
APPLICATION FILED APR. 6, 1918.
1,304,534.
Patented May 27, 1919.
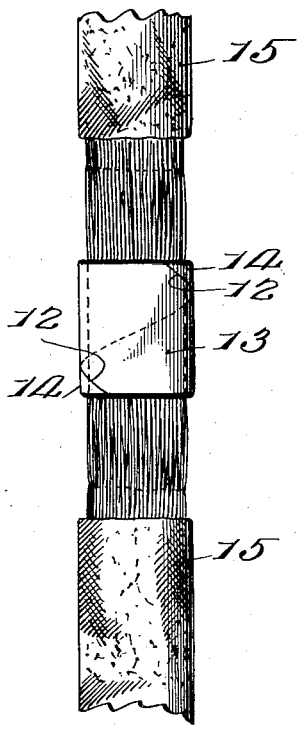
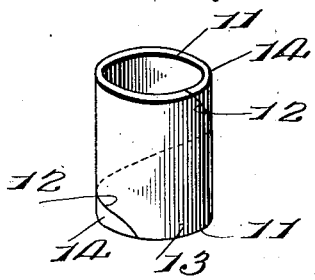
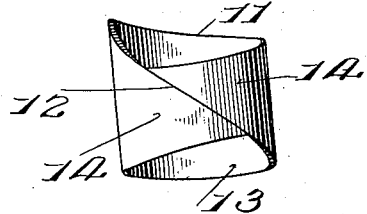
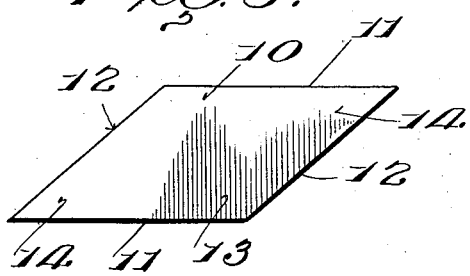
Inventor
N. K. Bowman
By Lacey & Lacey, Attorneys

UNITED STATES PATENT OFFICE.

NEWTON K. BOWMAN, OF CANTON, OHIO, ASSIGNOR TO THE AMERICAN MINE DOOR COMPANY, A CORPORATION OF OHIO.

CABLE-SPLICE.

1,304,534.  Specification of Letters Patent.  Patented May 27, 1919.

Application filed April 6, 1918. Serial No. 227,078.

*To all whom it may concern:*

Be it known that I, NEWTON K. BOWMAN, a citizen of the United States, residing at Canton, in the county of Stark and State of Ohio, have invented certain new and useful Improvements in Cable-Splices, of which the following is a specification.

This invention relates to an improved splice especially designed for connecting cables or like elements and has as its primary object to provide a device of this character particularly adapted for connecting the parted ends of the cables of mine gathering motors.

The invention has as a further object to provide a splice which may be struck as a blank from a single piece of sheet metal and adapted to be bent around the overlapping parts of the cable for firmly binding the said parts together.

A still further object of the invention is to provide a splice having gripping spurs and so constructed that when bent around the overlapping parts of a cable, the said spurs will mate to form the splice into a continuous sleeve encircling the cable with the said spurs acting to firmly grip the said parts of the cable together.

And the invention has as a still further object to provide a splice which, when applied, will form a smooth joint so that the cable may be wound upon a suitable spool therefor without interference by the splice.

Other and incidental objects will appear as the description proceeds. In the drawings wherein I have illustrated the preferred embodiment of the invention, and wherein similar reference characters designate corresponding parts throughout the several views:

Figure 1 is a fragmentary elevation showing my improved splice applied to the overlapping ends of a conventional cable, Fig. 2 is a perspective view showing the splice in detail, Fig. 3 is a plan view showing the blank from which the splice is formed, and Fig. 4 is a detail elevation showing the splice expanded.

Referring now more particularly to the drawings my improved splice is preferably formed from a blank 10 struck from a piece of suitable bendable or compressible sheet metal. As shown in detail in Fig. 3 of the drawings, this blank is provided with parallel end edges 11 and obliquely directed side edges 12 which are also preferably parallel. A trapezoidal splice body 13 is thus defined which terminates at its extremities in reversely presented spurs or tapering projections 14 having reversely beveled upper and lower edges adapted to mate with each other. The splice body thus formed is rolled upon itself, in the manner suggested in Fig. 4 of the drawings, to provide an expanded splice sleeve, the spurs 14 of the splice body being curved longitudinally into overlapping relation so that their beveled edges 12 confront each other.

As will now be seen, the expanded splice sleeve may be fitted over one end of a cable, conventionally shown at 15, at the break therein, when the parted ends of the cable may be threaded together or interlaced and the sleeve then positioned to surround the threaded ends of the cable. The sleeve is then contracted or compressed about the cable to tightly bind the overlapping ends thereof within the sleeve. Thus my improved splice may be readily applied and in this connection attention is directed to the fact that when the expanded sleeve is contracted, the spurs 14 of the sleeve will ride upon each other into position mating to provide a continuous cylindrical sleeve having square ends, the joint between the mating spurs defining a helical split in the sleeve. Furthermore, it will be seen that when the spurs are contracted about the overlapping ends of the cable, the said spurs will encircle the major portion of the circumference of the cable to clamp thereabout for firmly binding the parted ends of the cable together. The spurs will thus practically encircle the cable and owing to the individual gripping action of the said spurs about the cable, a joint is provided between the parted ends of the cable capable of withstanding extreme tensile stress.

I therefore provide a particularly simple and efficient construction for the purpose set forth and a splice which, when applied, will, as particularly shown in Fig. 1 of the drawings, provide a smooth joint between the parted ends of the cable so that the cable may be wound upon a suitable spool therefor without interference by the splice. As will, of course, be understood, a suitable insulating tape is preferably wound about the cable and over the splice at the joint between the cable ends, for covering the joint.

Having thus described the invention, what is claimed as new is:

1. A splice formed of a helically split sleeve having its split extending substantially a complete helical turn and defining reversely beveled spurs adapted to be contracted about parts to be connected mating to form the sleeve.

2. A splice including a body having substantially its entire length defined by reversely beveled spurs tapering toward the ends of the body and adapted to be contracted about parts to be connected with the spurs mating and substantially encircling the said parts.

3. A splice including a body terminating at its ends in reversely beveled spurs adapted to be brought together in mating relation about parts to be connected with the combined length of the spurs substantially encircling the said parts.

4. A splice including a body formed from a substantially diamond shaped blank having its tapered ends occupying substantially the entire length of the blank and defining spurs adapted to be brought together about parts to be connected substantially encircling the said parts and mating to define a splice sleeve.

5. A cable splice comprising a single metallic blank of diamond-shape bent on an axis parallel to the short axis of the blank to form a split ring, with the inclined adjacent edges of the points of the diamond-shaped blank bearing against each other.

6. A cable splice comprising a single metallic blank bent to form a ring, the confronting end edges of the strip being oblique and parallel to each other, and having sliding engagement as the blank is closed upon a cable.

In testimony whereof I affix my signature.

NEWTON K. BOWMAN. [L. S.]